United States Patent
Radtke

(10) Patent No.: US 11,646,598 B2
(45) Date of Patent: May 9, 2023

(54) METHODS AND APPARATUS FOR BATTERY FLOAT CHARGING OPERATION

(71) Applicant: Illinois Tool Works Inc., Glenview, IL (US)

(72) Inventor: David Edwin Radtke, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 663 days.

(21) Appl. No.: 16/657,067

(22) Filed: Oct. 18, 2019

(65) Prior Publication Data

US 2020/0127486 A1 Apr. 23, 2020

Related U.S. Application Data

(60) Provisional application No. 62/748,036, filed on Oct. 19, 2018.

(51) Int. Cl.
*H02J 7/14* (2006.01)
*H02J 7/16* (2006.01)
*B23K 9/10* (2006.01)
*H02J 7/34* (2006.01)

(52) U.S. Cl.
CPC .......... *H02J 7/1423* (2013.01); *B23K 9/1006* (2013.01); *B23K 9/1081* (2013.01); *H02J 7/16* (2013.01); *H02J 7/345* (2013.01)

(58) Field of Classification Search
CPC . H02J 7/1423; H02J 7/16; H02J 7/345; B23K 9/1006; B23K 9/1081
See application file for complete search history.

(56) References Cited

U.S. PATENT DOCUMENTS

| | | | |
|---|---|---|---|
| 2006/0037953 A1* | 2/2006 | Matthews | B23K 9/1006 219/133 |
| 2007/0181547 A1* | 8/2007 | Vogel | B23K 9/1081 219/130.1 |
| 2007/0278993 A1* | 12/2007 | Vogel | H02J 7/04 320/107 |
| 2009/0008368 A1* | 1/2009 | Beeson | H02J 7/00714 219/130.33 |
| 2010/0296204 A1* | 11/2010 | Ichikawa | H02J 7/1438 361/15 |
| 2011/0006046 A1* | 1/2011 | Albrecht | H01M 16/006 219/133 |

* cited by examiner

*Primary Examiner* — Brian W Jennison
(74) *Attorney, Agent, or Firm* — McAndrews Held & Malloy, Ltd.

(57) ABSTRACT

A welding-type power system that includes an engine configured to drive an electric generator to provide a first power output. In addition to the electric generator, the system includes an energy storage system to provide a second power output. The system includes energy storage devices and charging devices that are used to charge the energy storage devices. A controller is configured to control the charging devices to provide charging power output to the energy storage devices based on the parameters related to the charge level of the energy storage devices. The controller, using data received from sensors and charge measurement devices, determines the respective charge level for each energy storage device; compares the respective charge levels to one or more threshold charge levels; and controls the charging devices to provide a charging power output to the energy storage devices with a charge level that is below a threshold charge level.

19 Claims, 8 Drawing Sheets

METHODS AND APPARATUS FOR BATTERY FLOAT CHARGING OPERATION

CROSS REFERENCE TO RELATED APPLICATIONS

This application is a Non-Provisional Patent Application claiming priority to U.S. Provisional Patent Application No. 62/748,036, entitled "Methods and Apparatus for Battery Float Charging Operation" filed Oct. 19, 2018, which is herein incorporated by reference in its entirety.

BACKGROUND

Conventional welding-type power supplies provide power for welding-type tools. Some such power supplies are coupled to a fossil fuel-powered engine that drives an electric generator. In some cases, the generator output can be augmented by a secondary power source, such as a battery.

A battery charger, sometimes referred to as a charging device, is typically used to charge an energy storage device such as a battery. One type of battery charger and/or battery charging process is a battery float charger. A battery float charger charges a battery at a similar rate as a battery discharges by itself. In this fashion the battery float charger maintains a full capacity battery. A battery charger configured to maintain a battery float charge, in contrast to conventional battery charging, has circuitry and/or software to prevent the battery from overcharging. Overcharging may result in the battery getting damaged.

A system that can increase the operating life of energy storage systems would provide various advantages, such as reduced wear and lower operating costs, which is desirable.

SUMMARY

Apparatus and methods are disclosed of an engine driven welding-type power system that includes an engine to drive an electric generator to provide a first power output, and an energy storage device to provide a second power output, for example a hybrid welder. In particular, the system employs one or more charging devices connected to the energy storage device, where a controller controls the charging devices to provide a charging power output to an energy storage device of the one or more energy storage devices based on one or more parameters related to the charge level of the energy storage device, substantially as illustrated by and described in connection with at least one of the figures, as set forth more completely in the claims.

A charging device, for example a float charger for an energy storage device, is used to charge the energy storage device (e.g., a battery). A float charger charges an energy storage device at a similar rate as the energy storage device discharges by itself. In this fashion the float charger maintains a full capacity energy storage device. A charging device configured to provide a float charge, in contrast to a conventional battery charger, has circuitry and/or software to prevent the energy storage device from overcharging. The use of the charging device and/or float charging process to charge the energy storage device prevents the energy storage device from getting damaged and extends the lifetime of the energy storage device.

In examples, a sensor is configured to measure a parameter of the energy storage device, the controller is being configured to receive the measured parameter from the sensor, and determine a charge level of the energy storage device based on the parameters. For example, the characteristics may include voltage, temperature, current, total time in use, or percentage of energy storage capacity depleted during each discharge cycle. The controller may receive from the measurement device sensor measurement data and control the charging device to provide an output to charge the energy storage device. The controller may use the sensor measurement data and/or the process sensor measurement data to calculate the parameters for float charging the energy storage device and may use this information to set the operational and functional parameters of the charging device in order to execute a charging process that maintains the health of the energy storage device and extends the operational lifetime of the energy storage device.

In some examples, the controller may use input received from a user, via a user interface, to set the power output level of the charging device, or the start time of the charging device. The user and/or the controller may set the duration of the output time expiration and also the threshold charge level of the charging device. The controller may set various timer settings, voltage settings and/or current settings based on various inputs and/or analysis of historical data. The controller may calculate and set the operational parameters of the charging device, and also to control the circuitry that couples the charging device to the energy storage device. The controller may control a regulator (e.g., electric switches) that connect the charging device to the energy storage device to control the flow of current into the energy storage device from the charging device.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
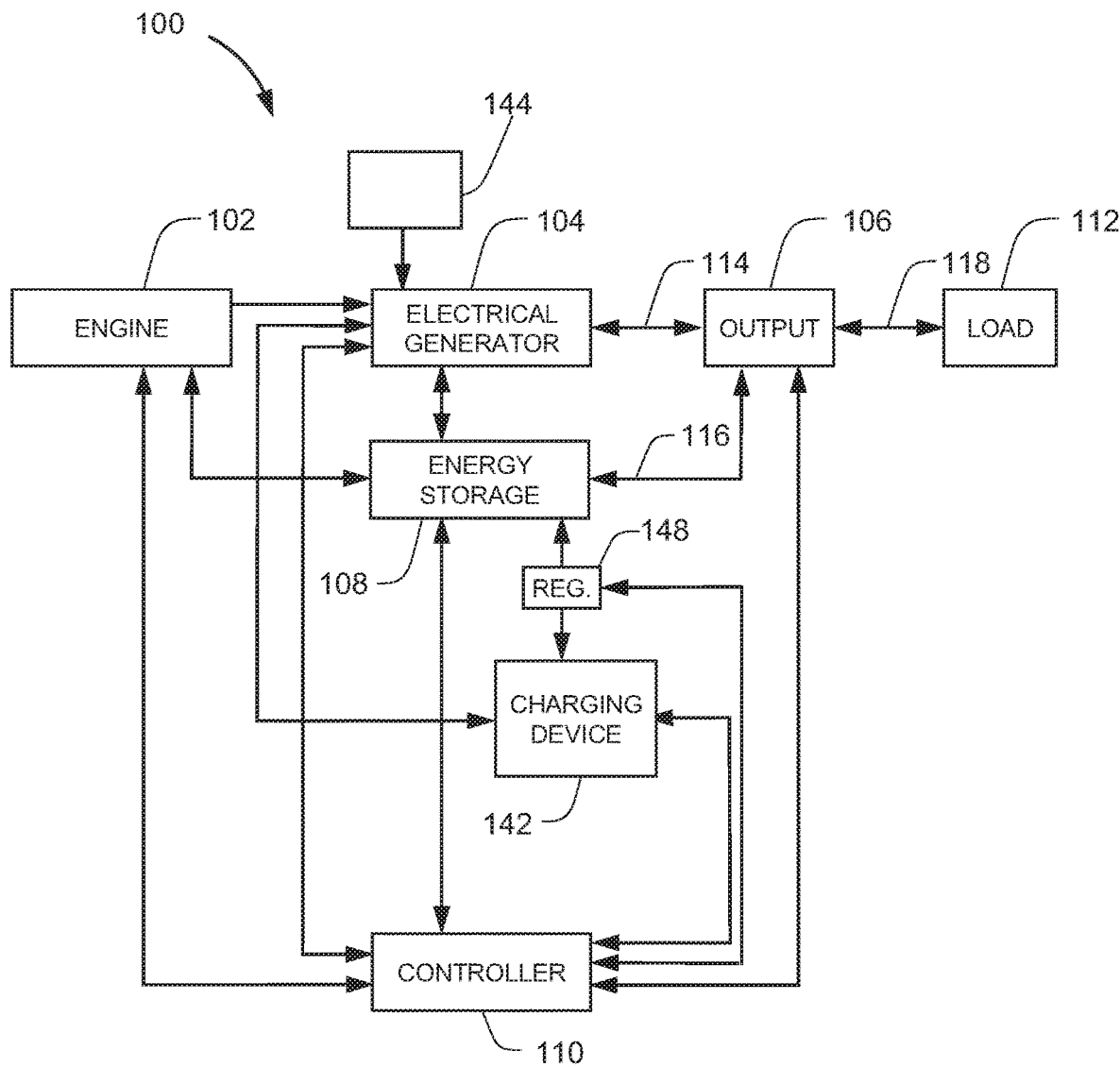
FIG. 1 is a block diagram of an example welding-type power system in accordance with aspects of this disclosure.

Disclosed are examples of an engine driven welding-type power system that includes an engine to drive an electric generator to provide a first power output, and an energy storage device to provide a second power output (e.g., a hybrid welder). In particular, the system employs one or more energy storage devices, and one or more charging devices that are used to charge the energy storage devices. The energy storage devices cooperate with the engine to supplement and/or substitute the power provided to an output of the system by the engine based on a desired output from each of the engine and the energy storage devices.

In some examples, an engine driven welder employs an engine (e.g., a diesel-powered engine, a 25-horse power output, etc.). An energy storage device, such as a lead acid type rechargeable battery, can be added to the system, which can be configured to supplement or replace a power output of the engine (e.g., an electric generator driven by the engine). One or more charging devices are used to charge the energy storage devices. In examples, power output from the engine may be prioritized over power output from the energy storage device, such as when replacement of the energy storage device is difficult. In other examples, discharge of the energy storage device may be prioritized over engine use, such as when fuel for the engine is not readily available.

In some examples, a controller can automatically adjust the first and second outputs based on a variety of inputs. In this example, the controller can determine a balance of power output for each of the engine and the energy storage device based on a variety of factors. The factors can include the particular operation to be performed (e.g., required power output, length of time the operation is to be performed, etc.), data from sensors associated with one or both of the engine and/or the energy storage device, and historical data compiled by the system during use, and/or historical data compiled by other hybrid systems. Additionally or alternatively, the system controller could "learn" (e.g., through artificial intelligence, machine learning techniques, etc.) the operator's usage habits and determine desired operational parameters based on analysis of historical data. Based on the data, algorithms run by the controller can manage the output, and recharge and discharge cycles of the energy storage device, to meet the demands of the system while incorporating the operator's preferred standards.

Maximizing the useful life of an energy storage device (e.g., a rechargeable battery, etc.) is a concern for modern welding systems, including hybrid systems that provide both an engine driven power output and an additional and/or alternative energy storage device to power equipment and welding processes. Ideally, energy storage devices would last the life of the equipment they support. However, in practice, energy storage devices often fail before the end of the useful life of the associated equipment (e.g., the engine), and must be replaced. For example, each rechargeable energy storage device is rated for a particular useful life (e.g., a target life, useful life, capacity, etc.). Useful life and/or capacity may depend on a variety of factors, including an average maintained charge capacity, a number of discharge cycles performed, depth of each and/or an average discharge event, operating temperatures, manufacturing date, and in-service date, to name but a few. These and other factors can be used to calculate a remaining effective life of an energy storage device, such as remaining capacity, which can determine how often an energy storage device should be replaced.

In some examples, an energy storage device charger, also referred to herein as a charging device, is used to charge an energy storage device such as a battery. One type of charger is a float charger. A float charger charges an energy storage device at a similar rate as the energy storage device discharges by itself. In this fashion, the float charger maintains a full capacity charge in the energy storage device. A float charger, in contrast to a conventional battery charger, has circuitry and/or software to prevent the energy storage device from overcharging. Overcharging may result in the energy storage device getting damaged. Float charging is performed as a charging method for maintaining the health of the energy storage device and is used when the charge of the energy storage device is at a level that is near a full charge level.

In a charging process that includes multistage charging, float charging is the final stage in the energy storage device charging process. For example, the float charging device receives data from a measurement device indicating that the energy storage device is at a level below the full charge level. The charging device then applies a controlled amount of voltage and/or current that is used to charge the energy storage device without causing damage to the energy storage device. Once data from the measurement device indicates that the energy storage device charge is at a desired level (e.g., a predetermined or maximum charge level), and/or that the energy storage device is fully charged, the charging device is turned off and, as a result, no more voltage and/or current is delivered to the energy storage device.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "controller" or "control circuitry" includes digital and/or analog circuitry, discrete or integrated circuitry, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a supercapacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" or "welding operation" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

In disclosed examples, a welding system includes a welding-type power system having an engine to drive an electric generator to provide a first power output, an energy storage system to provide a second power output, the energy storage system including one or more energy storage devices, and one or more charging devices connected to the one or more energy storage devices. A controller controls the one or more charging devices to provide a charging power output to an energy storage device of the one or more energy storage devices based on one or more parameters related to the charge level of the one or more energy storage devices. In examples, the one or more parameters include a charge level of the energy storage device, duration of a timer, or a user input.

In some examples, a user interface configured to send information to and receive information from the controller, wherein the information includes instructions to adjust one or more of a charging power output start time, a duration of a charging power output timer expiration, or one or more threshold charge levels.

In examples, one or more regulators are arranged between the one or more charging devices and the one or more energy storage devices, wherein the one or more regulators include one of a resistor, a switch, or an inductor.

In some examples, the one or more charging devices include one or more of a lead acid battery, a nickel cadmium battery, a lithium ion battery, a capacitor, a supercapacitor, a fuel cell, or any combination thereof. In examples, the one or more energy storage devices includes a lead acid battery.

In disclosed examples, a welding system has a welding-type power system includes an energy storage system to provide a power output, the energy storage system having one or more energy storage devices, one or more charging devices connected to the one or more energy storage devices, and a controller to determine a respective charge level for each energy storage device, compare the respective charge levels to one or more threshold charge levels, and control the one or more charging devices to provide a charging power output to an energy storage device of the one or more energy storage devices with a charge level below a first threshold charge level of the one or more threshold charge levels.

In examples, the controller is further configured to control the one or more charging devices to end provision of the charging power output to the energy storage device in response to the charge level exceeding a second threshold charge level.

In some examples, the controller is further configured to control a single charging device of the one or more charging devices to provide the charging power output to two or more energy storage devices of the one or more storage devices with a charge level below the first threshold charge level.

In examples, the one or more charging devices includes a first charging device and a second charging device, and the one or more energy storage devices includes a first energy storage device and a second energy storage device.

In some examples, the controller is configured to control the first charging device to provide a first charging power output to the first energy storage device; and control the second charging device to provide a second charging power output to the second energy storage device.

In examples, the controller is configured to control a rate or level of the charging output to the energy storage device based on a characteristic of the energy storage device.

In some examples, the characteristic includes one or more of voltage, temperature, current, total time in use, or a relative charge level.

In examples, the controller is further configured to rank each energy storage device based on a comparison of each respective charge level; and provide the charging power output to an energy storage device with a lower relative charge level prior to an energy storage device with a higher relative charge level.

In some examples, the controller is further configured to generate an alert when the charge level of the energy storage device falls below one or more threshold charge levels or when the charging power output does not increase the charge level of the energy storage device. (C15)

In examples, a controller that includes one or more of a network interface or a memory storage, the controller further configured to: receive information from the system; store the information in the memory storage device; or transmit the information to a remote computing platform via the network interface.

In disclosed examples, a welding system has a welding-type power system including an engine to drive an electric generator to provide a first power output, an energy storage system to provide a second power output, the energy storage system including a first energy storage device and a second energy storage device, a first charging device and a second charging device connected to the first and second energy storage devices, respectively. A controller determines a first and second charge level for the first and second energy storage devices, respectively, compares the first and second charge levels to one or more threshold charge levels, and controls the one or more of the first and second charging devices to provide a charging power output to one or more of the plurality of energy storage devices with a charge level below a first threshold charge level of the one or more threshold charge levels.

In examples, a supplemental power source connection to receive a supplemental power output from a supplemental power source, wherein the supplemental power source is one or more of an engine driven generator or mains power.

In some examples, the controller is further configured to control the supplemental power source to provide the supplemental power output to the one or more charging devices or to the plurality of energy storage devices.

In examples, the connection includes a step-down converter to connect one of the electric generator or the supplemental power supply to the one or more charging devices, the converter to condition the first power output in order to recharge the one or more charging devices from one or more of the electric generator or the supplemental power supply.

FIG. 1 is a block diagram of an example welding-type power system 100. The example power system 100 includes an engine 102 connected to an electric generator 104 to feed an output 106 (e.g., a power receptacle). The electric generator 104 may be connected to an external power source 144 such as an electric outlet. An energy storage device 108 can also be connected to the output 106, which can provide power to a load 112. In an example, the power output 106 is configured for a particular type of connection (e.g., a welding-type torch cable), while in other examples the power output 106 can be modified to accept multiple types of connectors. In the example of FIG. 1, the output 106 may be configured with multiple connection outputs, and/or one or more adapters to accommodate various loads 112 (e.g., a welding-type torch, a rechargeable battery, 120-volt power cord, etc.).

A controller 110 is connected to one or more of the engine 102, generator 104, output 106, energy storage device 108, and a charging device 142. The controller 110 can be configured to control the engine 102, via the generator 104, to generate a first power output 114 to the output receptacle 106, whereas the energy storage device 108 is configured to provide a second power output 116. The first and second power outputs 114 and 116 can be combined into a total power output 118 to power the load 112.

Parameters associated with each output, from the engine 102 and/or the energy storage device 108, can be determined by an operator (e.g., via a user interface, FIG. 3), by trend analysis, by a determined mode of operation, etc. The controller 110 can automatically command the engine 102 and/or the energy storage device 108 to output power based on the power demand (e.g., the total power output 118). In an example, a change in power demand, such as by connecting or activating a device (e.g., load 112) at the output 106, generates an automatic response by the controller 110 to activate the engine 102 (e.g. to turn on, increase speed, etc.) and/or draw power from the energy storage device 108.

The welding-type power system 100 can provide power to various loads 112, such as welding-type power to a welding-type torch (e.g., MIG, TIG, GMAW, FCAW, plasma cutter, etc.), power to an auxiliary device (e.g., a preheating device, a wire feeder, a grinder, lighting, etc.), as well as provide battery level power to charge a battery (i.e. external or internal to the system). The various loads may be identified by a feedback signal associated with the output 106, for example. Thus, the feedback signal can inform the controller 110 as to what load is present, identify a corresponding mode of operation, etc. For example, when the load 112 is a welding-type torch, the controller 110 can determine a type of load (e.g., associated with a welding mode of operation) associated with an expected measured power draw. Additionally or alternatively, a rechargeable battery and/or auxiliary type tool can be connected to the output 106, such that the controller 110 determines the type of load and mode of operation (e.g., a battery charging mode, a 120 V output, etc.).

Some engines may have specific ranges of output (e.g., associated with operating speeds, temperature profiles, etc.) where fuel efficiency is at a peak. Efficiency of the engine 102 may also be affected by the load on the engine (e.g., as the amount of torque to turn attached components increases). For example, the engine 102 may be driving the electric generator 104, which may require additional torque to generate a higher power output 114. Additionally or alternatively, the engine 102 may be driving an air compressor, which may increase the speed and/or torque from the engine 102 to operate the connected components.

In some examples, the energy storage device 108 is a rechargeable battery pack (e.g., a lithium-ion battery, a nickel-metal hydride battery, lead-acid battery, etc.). In other examples, the energy storage device 108 is a hybrid battery module, a capacitor, a supercapacitor, or any other type of suitable storage device, or a combination of a rechargeable battery pack and a hybrid battery module.

In some examples, the energy storage device 108 may include a plurality of energy storage devices packed together to form one energy storage device 108. In other examples, the energy storage device 108 may include of a collection of separate energy storage devices that are either independent of each other or alternatively are communicatively and/or electrically coupled to each other (see examples illustrated in FIG. 4 and FIG. 5). Similarly, in some examples, the charging device 142 may include of a plurality of charging devices packed together to form one charging device 142. In other examples, the charging device 142 may include a collection of separate charging devices that are either independent of each other or alternatively are communicatively and/or electrically coupled to each other (see examples illustrated in FIG. 4 and FIG. 5). The charging device(s) 142, may be connected to the energy storage device(s) 108, through an electrical regulator 148 which may, for example, be an electric switch that may be used to disconnect the electrical connection between the charging device 142 and the energy storage device 108.

In examples, information regarding system usage trends based on the monitored signals can be analyzed and stored (e.g., in a memory storage device). These stored trends can be used to predict when the controller 110 should control the charging device 142, and/or the regulator 148 to activate (e.g., provide a float charge) in order to charge the energy storage device 108, in response to information indicating the energy storage device is charged at a desired level (e.g., a predetermined and/or maximum charge level). The usage trends can be specific to the system 100, 200, or be loaded on the controller 110 to reflect usage trends of other systems.

Based on one or more measured parameters (e.g., change in voltage, change in current, change in temperature, etc.), as well as historical data, the controller 110 can determine the amount of power for the float charging operation.

For example, the controller 110 is configured to determine a charge level for the energy storage device 108. The controller 110 compares the charge level to one or more threshold charge levels. If the charge level is outside the desired threshold charge level, the controller 110 controls the charging device 142 and/or the regulator 148 to provide a charging power output to the energy storage device 108. This can be provided as a float type charge, as disclosed herein, applied during periods when the engine 102 and/or generator 104 are not in operation (e.g., during periods when the system 100 is in storage and/or not in use) when the energy storage device 108 is likely to slowly discharge without providing power to an output.

When a desired charge level is achieved (e.g., exceeds a threshold charge level, a charge level within a range of charge levels, a maximum charge, etc.), the controller controls the charging device to end provision of the charging power output to the energy storage device.

In some examples, the controller 110 is further configured to control a single charging device 142 to provide the charging power output to two or more energy storage devices 108. In some examples, two or more charging devices 142 are configured to provide charging output power to two or more energy storage devices 108, respectively. In some examples, multiple charging devices 142 are configured to provide charge to a single energy storage device 108. In each implementation, the controller 110 controls a rate or level of the charging output to the one or more energy storage devices 108, for example, based on a characteristic of the energy storage device, a user provided input, historical data, and/or information from a networked source. The characteristic may include one or more of voltage, temperature, current, total time in use, or a relative charge level.

The amount of energy the energy storage device 108 holds is measured in capacity. Capacity is the leading indicator that determines useful life of the energy storage device 108. The useful life of an energy storage device 108 can be described with reference to the number of remaining cycles. For example, Lithium- and nickel-based rechargeable batteries deliver between 300 and 500 full discharge/charge cycles before the capacity drops below 80 percent.

In examples, a discharge/charge cycle is the process of charging and discharging the energy storage device 108 to power a load, and recharging the device 108. A cycle refers to a sequence in which a charged energy storage device is discharged and then recharged. One complete sequence constitutes one cycle. The process can be one indicator of the energy storage device's 108 remaining useful life and/or capacity, as the number of discharge/charge cycles affects useful life more than the mere passage of time.

Additionally, the depth of each discharge event can be a factor in determining remaining useful life of the energy storage device 108. If, for example, no more than 20 percent of the capacity is discharged at any given time, even a greater number of discharge/charging events will have a relatively limited impact on the useful life versus a smaller number of discharge/charging events that completely drain the energy storage device 108. For example, at an 80% depth of discharge, an energy storage device may estimate about 400 cycles remaining. For a 100% depth of discharge, an energy storage device may estimate about 320 cycles remaining.

Additionally or alternatively, the controller 110 can perform an analysis based on manufacturing specifications that can affect useful life of the energy storage device 108, including the type, number and/or the quality of energy storage device cells used. In addition to cycling events, other factors can contribute to loss of capacity. For example, keeping the energy storage device at an elevated temperature induces stress to the components therein. For instance, a fully charged energy storage device (e.g. a Li-ion battery) stored at an elevated temperature (e.g., about 40° C.) may lose significant capacity (e.g. about 35 percent) over a period of time (e.g., a year) without ever cycling.

Additionally or alternatively, in a hybrid welding system the controller 110 is configured to monitor and control when and how the energy storage device 108 is to be used to augment the weld power output 116 at the output 106. For example, the power from the energy storage device 108 can supplement the full operating power from the engine 102 to provide a greater power output than the rated engine output. In this example, high power activities, such as clearing a short or a gouging operation, can be performed by conditioning the power output 114 via a converter.

Figure 2:
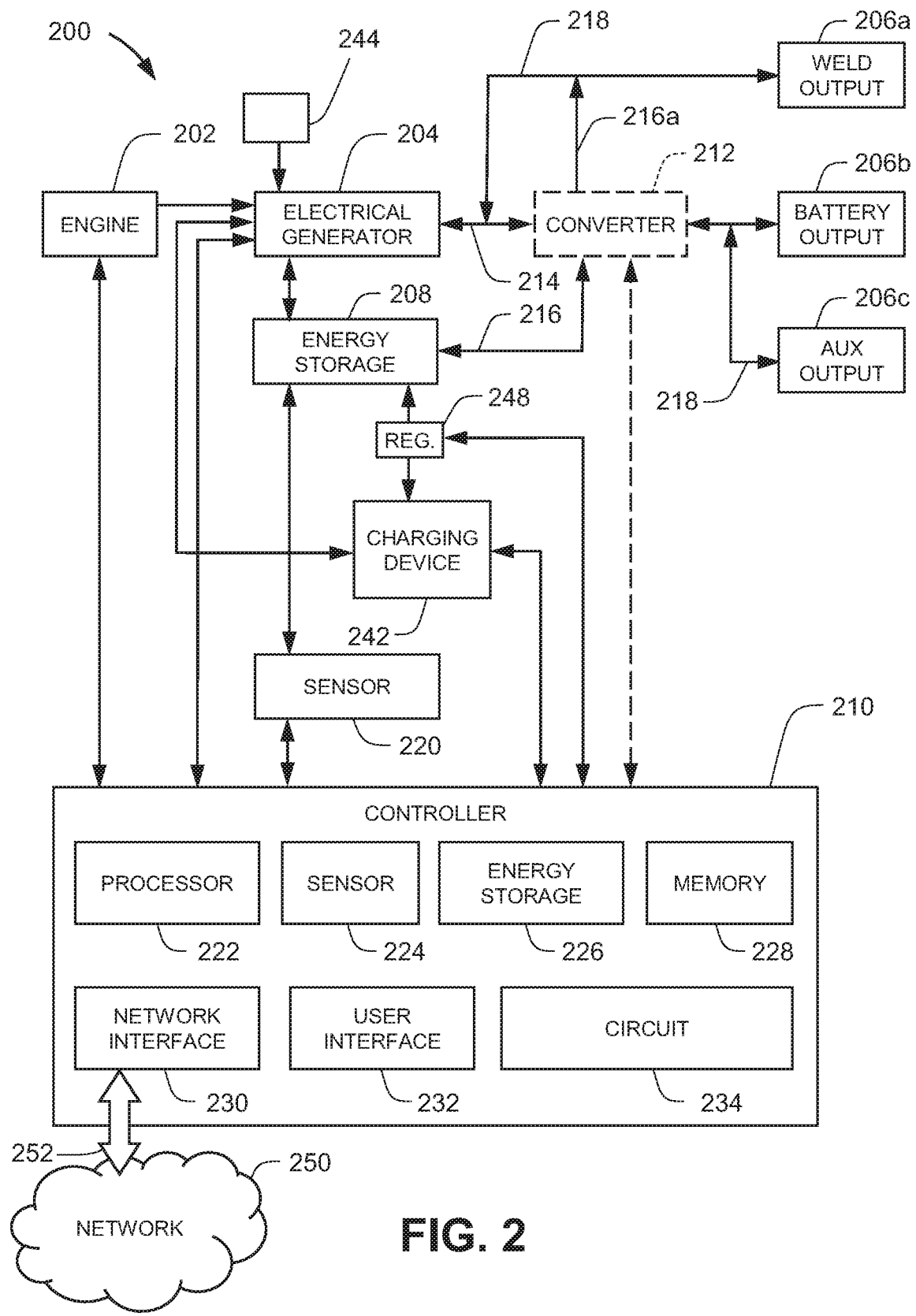
FIG. 2 illustrates a block diagram of another example welding-type power system in accordance with aspects of this disclosure.

FIG. 2 is a block diagram of an example welding-type power system 200. System 200 can be configured to operate with one or all of the features disclosed with respect to system 100, as shown in FIG. 1. The example power system 200 includes an engine 202 connected to an electric generator 204 to provide a power output 214 with a voltage sufficient to power a welding-type tool, directed to a welding output 206*a*, a battery charging output 206*b*, and/or an auxiliary power output 206*c*. In some examples, a converter 212 can be used to convert power for the battery charging output 206*b* and/or the auxiliary output 206*c* (e.g., to power auxiliary power components, such as a wire feeder, compressed air system, etc.). The system 200 may be connected to an external power source 244 such as for example an electric outlet.

In some examples, an energy storage device 208 is provided, and may include a plurality of energy storage devices packed together to form one energy storage device 208. In other examples, the energy storage device 208 includes a collection of separate energy storage devices that are either independent or partially independent of each other or alternatively are communicatively and/or electrically coupled to each other (see examples illustrated in FIG. 4 and FIG. 5). Similarly, in some examples, a charging device 242 may include a plurality of charging devices packed together to form one charging device 242. In other examples, the charging device 242 may include a collection of separate charging devices that are either independent or partially independent of each other, or alternatively are communicatively and/or electrically coupled to each other (see examples illustrated in FIG. 4 and FIG. 5). The charging device(s) 242, may be connected to the energy storage device(s) 208, through an electrical regulator 248 which may for example be an electric switch or other hardware and/or software device to connect, disconnect and/or regulate the electrical connection between the charging device 242 and the energy storage device 208.

A system sensor(s) 220 monitors characteristics corresponding to, among other things, engine 202 operational parameters (e.g., run time, temperature, fuel consumption, etc.), energy storage device 208 parameters (e.g., charge level, number of discharge/charge events, depth of charge, time in operation, etc.) and one or more parameters associated with total power output 218 and power demand (e.g., a voltage, current, temperature, resistance, impedance, etc.). The information provided by the sensor 220 to a controller 210 is used to determine when the engine 202 and the energy storage device 208 are to be employed to output power, for how long, at what level, etc.

The controller 210 can be configured as a microcontroller, or to include a processor 222, to perform as a programmable logic circuit (e.g., circuit 234), a system-on-chip, a programmable logic device, and/or any other type of logic circuit. In some examples, the controller 210 can include a memory storage device 228, an energy storage device 226, a sensor 224, a network interface 230, and/or a user interface 232.

The circuit 234 can be implemented in hardware and/or software, and can be configured to receive information regarding the total power output 218, a capacity level of the energy storage device 208, and a remaining target life of the energy storage device 208. The information can correspond to, for example, engine operational parameters, energy storage device parameters, other sensor data, a user input, as well as data related to trend analysis, threshold values, profiles associated with a particular mode of operation, etc., and can be stored in a comparison chart, list, library, etc., within memory 228.

In examples, information regarding system usage trends based on the monitored signals can be analyzed and stored (e.g., in memory 228). These stored trends can be used to predict when the controller 210 should control the charging device 242, and/or the regulator 248 to activate (e.g., provide a float charge) in order to charge the energy storage device 208, in response to information indicating the energy storage device is charged at a desired level (e.g., a predetermined and/or maximum level). The usage trends can be specific to the system 100, 200, or be loaded onto the memory 228 (via interfaces 230, 232) to reflect usage trends of other systems.

Based on one or more measured parameters (e.g., change in voltage, change in current, change in temperature, etc.), as well as historical data, the controller 210 can determine the amount of power for the float charging operation.

The system 200 can include a user interface 232 (e.g., a switch, a computer input device, etc.) to provide options for an operator to control a function of the power sources and/or outputs at the system 200, such as designating control parameters for a float charging operation. Additionally or alternatively, the user interface 232 can include a list of operations with either a set of determined and/or known parameters (e.g. associated with a specific energy storage device or type, a particular system rating, etc.), or a list of operations that correspond to a learned operation. Thus, the known or historical actions and conditions during a particular operation will aid in the determination of when the charging device 242 is to provide charging to the energy storage device 208, as well as the level of power output needed for such a charging operation based on one or more parameters associated with the energy storage device 208.

In some examples, the controller 210 includes a network interface 230 configured to send and/or receive information from a remote device (e.g., a remote computer, a cloud computing environment, etc.). The network interface 230 may be communicatively coupled to the network 250 as indicated by the arrows 252 which may, for example, be wireless or wired communication couplings. The calculations, determinations, comparisons, analysis, stored data, etc., can be performed and/or updated via network interface 230.

In some examples, one or more component may be in direct communication with another component, for example, one or more of the various system components (e.g., the controller 210) can be directly linked to any one or more of the other components (e.g., the electric generator 204, the energy storage device 208, the charging device 242, the regulator 248, the converter 212, the sensors 220, etc.) to facilitate communication.

The system 200 is configured to operate in a hybrid mode, providing output power 218 from an output of one or both of the generator 204 or the energy storage device 208. For example, if the engine 202 reaches an appropriate operating speed to satisfy the measured power demand, the controller 210 may disable/turn off the converter 212 and therefore stop supplementing with power from the energy storage device 208. The energy storage device 208 can then connect to the engine 202 via the converter 212 to recharge while the engine 202 is rotating at normal operating speeds. The converter 212 can be a buck converter in some examples. In some examples, the converter 212 is a boost converter and/or a bi-directional converter.

In any event, the controller 210 can selectively control the power provided to each output. Consistent with the disclosed examples, each of the outputs 206a, 206b, 206c can provide the same level of power (e.g., each operating in a welding mode or a battery recharging mode), or different levels of power. In this example, the output 206a can be operating in a welding mode, and output 206b can be powering a rechargeable battery. In yet another example, the output 206c provides auxiliary 115 or 220 VAC power, independent of or simultaneously during a welding operation to power, e.g., lights, a grinder, a battery charger, etc.

In some examples, power output 216 contributes to the total power output 218 to provide welding power to weld output 206a. Thus, a converter 212 is used to condition power 216a suitable for weld type power. In other examples, power output 214 and/or power output 216 is conditioned by the converter 212 to provide power output 218 to battery output 206b and auxiliary output 206c. In an example, the circuit 234 determines that only one of the two power sources is to be activated. In this scenario, the total output 218 equals either the power output 214 or the power output 216.

Figure 3:
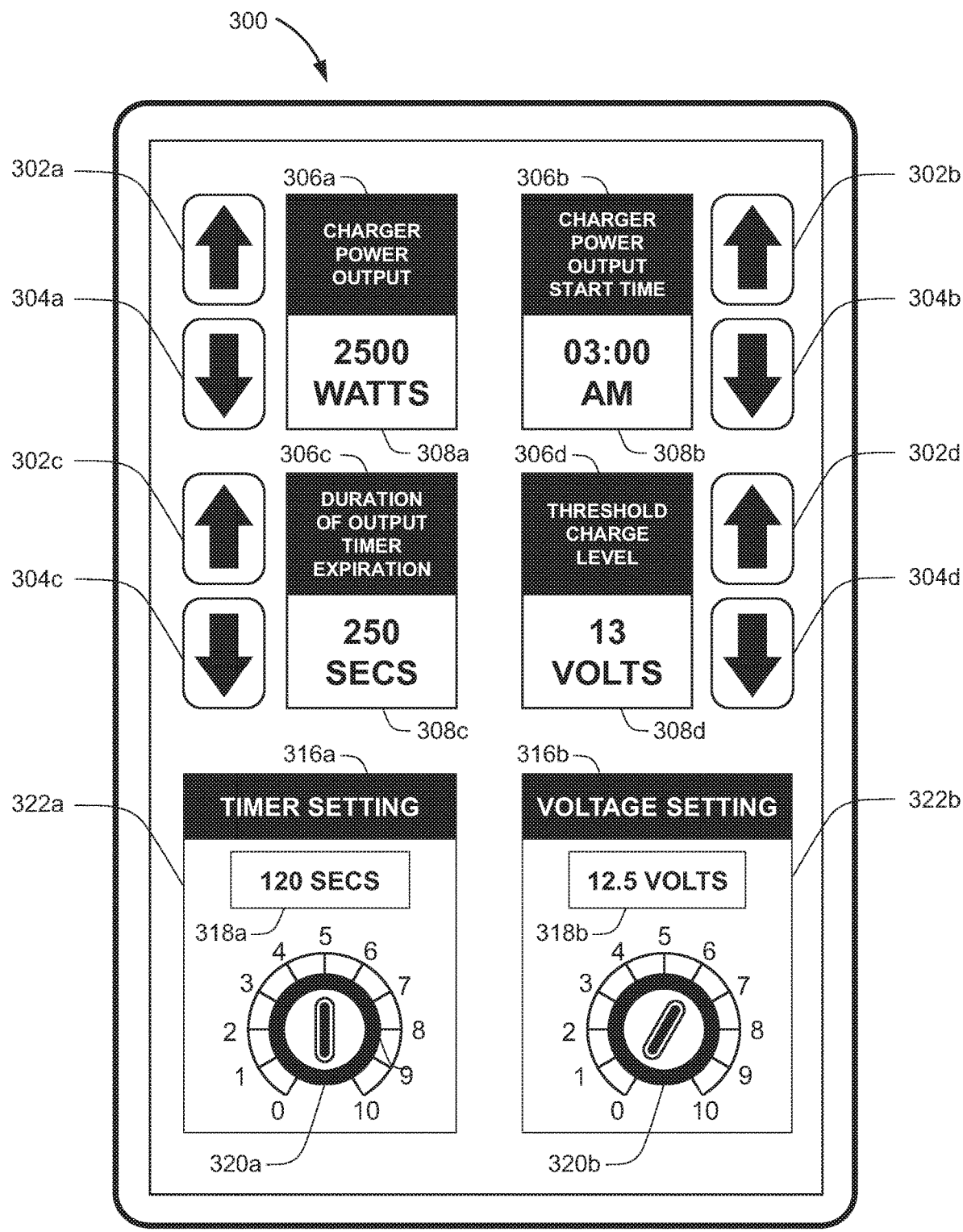
FIG. 3 illustrates an example user interface for operating a welding-type power system in accordance with aspects of this disclosure.

FIG. 3 illustrates an example interface 300 (e.g. similar to user interface 232) to provide graphic representations of the selected parameters (e.g., voltage, duration of charge operation, etc.) associated with a charging device (e.g., the charging device(s) 142, 242). The interface 300 can be configured as a display with integrated touchscreen capabilities, or reflect changes made via a separate knob, remote, wireless commands, etc. In some examples, the interface 300 displays operating parameters that reflect determinations from execution of one or more algorithms or logic routines (e.g., results from analysis of the controller 110, 210). For example, the knob can be a single knob-type selector with a range of values associated with one or more parameters of the energy storage device(s), charging device(s), etc., for controlling a float charging operation.

As shown, the interface 300 displays information regarding a power output of a selected charging device in section 306a. Therein, a charger output value 308a (e.g., corresponding to power output of charging device 142, 242) is provided. Selectors 302a and 304a can provide scrolling features and/or allow for the charger power output values to be adjusted. The interface 300 also displays information regarding a start time for a charger power output operation in section 306b. Therein, a charger power output start time value 308b (e.g., corresponding to power output starting time of charging device 142, 242) is provided. Selectors 302b and 304b can provide scrolling features and/or allow for the power output start time values to be adjusted.

The interface 300 also displays information regarding a duration of output timer expiration in section 306c. Therein, a duration of output timer expiration value 308c is provided. Selectors 302c and 304c can provide scrolling features and/or allow for the output timer expiration values to be adjusted. The interface 300 also displays information regarding threshold charge level in section 306d. Therein, a threshold charge level value 308d is provided. Selectors 302d and 304d can provide scrolling features and/or allow for the threshold charge level values to be adjusted. The interface 300 also displays information regarding timer setting 316a in section 322a. Therein, a timer setting value 318a is provided. Selector 320a can provide adjusting features and/or allow for the timer setting values to be adjusted. The interface 300 also displays information voltage setting 316b in section 322b. Therein, a voltage setting value 318b is provided. Selector 320b can provide adjusting features and/or allow for the voltage setting values to be adjusted.

Figure 4:
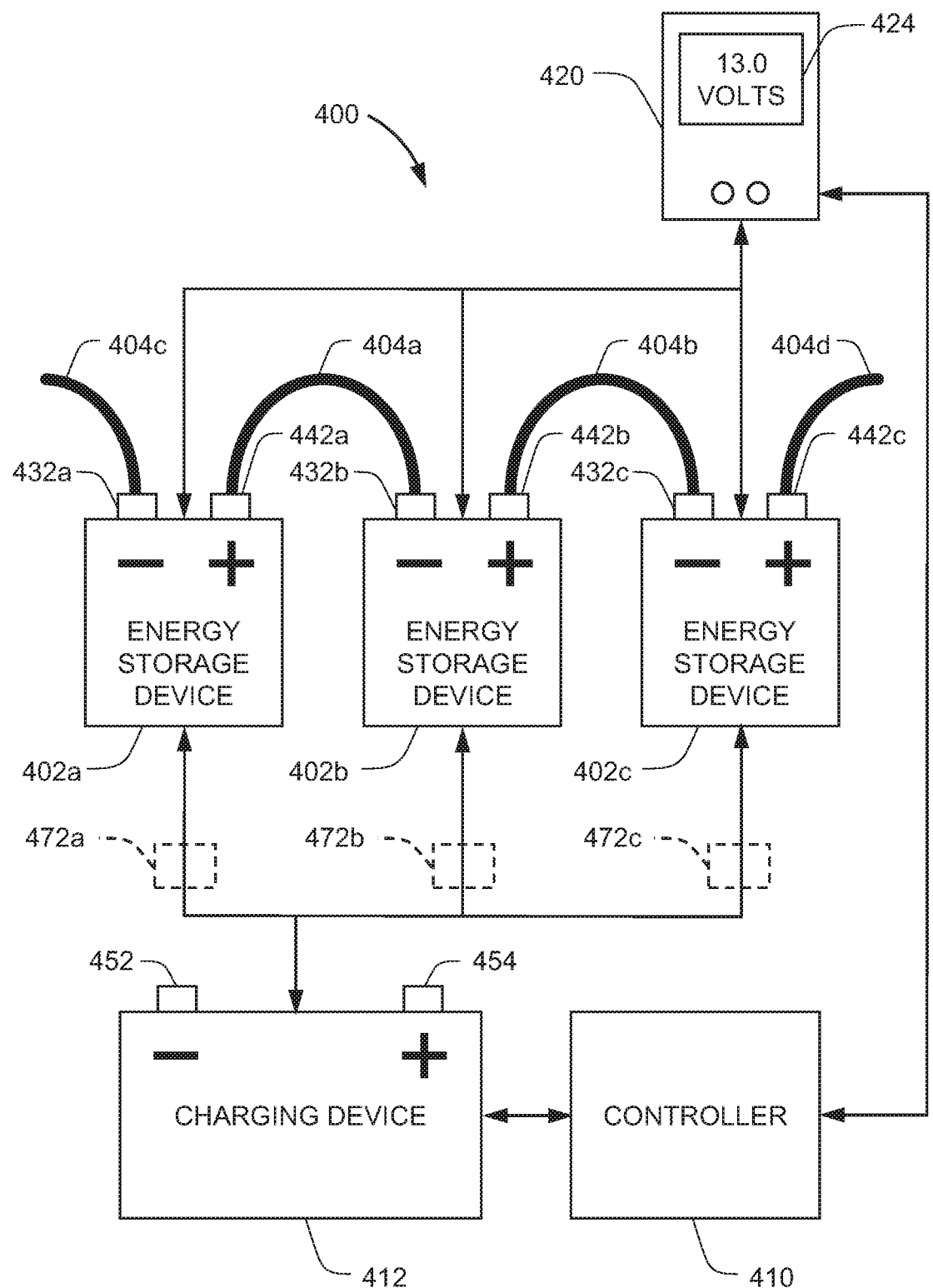
FIG. 4 illustrates an example of a plurality of connected energy storage devices in accordance with aspects of this disclosure.

FIG. 4 illustrates an example of a system 400 with energy storage devices 402a, 402b and 402c. The energy storage device 402a has a negative terminal 432a and a positive terminal 442a. The energy storage device 402b has a negative terminal 432b and a positive terminal 442b. The energy storage device 402c has a negative terminal 432c and a positive terminal 442c. The illustration of system 400, as an example, depicts only three energy storage devices 402a, 402b and 402c connected in series. However, the number of energy storage devices may be one, two, three or more, and may be connected in series or parallel.

In the example of FIG. 4, the energy storage devices 402a, 402b and 402c, are connected in series with each other via the electrical connectors 404a and 404b. Connectors 404c and 404d may be used to connect the energy storage devices 402a and 402c to other devices or other connectors. The energy storage devices 402a, 402b and 402c may be connected to the charging device 412. The charging device 412 may have a negative terminal 452 and a positive terminal 454. There may exist between the charging device 412 and the energy storage devices 402a, 402b and 402c electrical regulators 472a, 472b and 472c as indicated in the illustration of FIG. 4. These electrical regulators 472a, 472b and 472c may be for example electrical switches that may be used to connect and/or disconnect the energy storage device 402a, 402b and 402c from the charging device 412 and/or control the flow of current between the charging device 412 and the energy storage device 402a, 402b and 402c. The illustration of system 400, as an example, depicts only one charging device 412. However, the number of charging devices may be one, two, three or more.

The energy storage devices 402a, 402b and 402c may be electrically coupled to one or more electrical sensors (e.g. electrical sensor 220) which for example could be integrated into a measurement device 420 which may display, on a display unit 424, the value of the measured parameters. The measured parameters may be for example voltage, current or other electrical parameters. The illustration of system 400, as an example, depicts only one measurement device 420 which is electrically coupled to the energy storage device 402a, 402b and 402c. However, the number of measurement devices may be one, two, three or more.

As depicted in FIG. 4 a controller 410, which may be an example of the controller 110 in the system 100 of FIG. 1 or the controller 210 in the system 200 of FIG. 2, may be communicatively coupled to the measurement device 420 and the charging device 412. The controller 410 may receive signals, information and data from the measurement device 420 and process the signals, the information and the data to calculate and determine process parameters in order to control the operation and the functions of the charging device 412.

Figure 5:
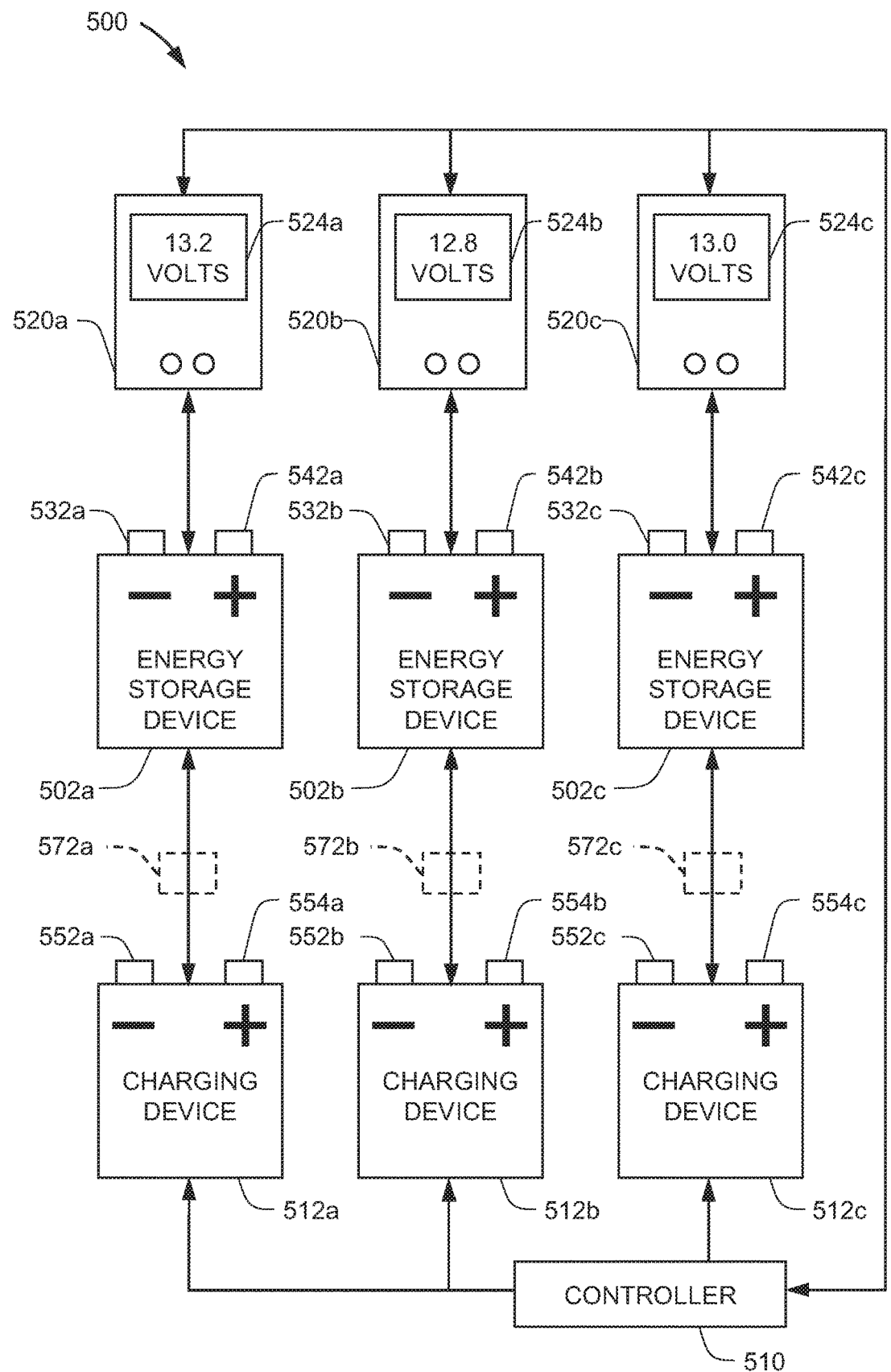
FIG. 5 illustrates an example of a plurality of connected energy storage devices connected to a charging device and a measurement device in accordance with aspects of this disclosure.

FIG. 5 illustrates an example of a system 500 with energy storage devices 502a, 502b and 502c. The energy storage device 502a has a negative terminal 532a and a positive terminal 542a. The energy storage device 502b has a negative terminal 532b and a positive terminal 542b. The energy storage device 502c has a negative terminal 532c and a positive terminal 542c. The illustration of system 500, as an example, depicts only three energy storage devices 502a, 502b and 502c. However, the number of energy storage devices may be one, two, three or more.

As shown in the example of FIG. 5, the energy storage devices 502a, 502b and 502c may be connected in series with each other via any electrical connectors. Alternative connections of the energy storage devices 502a, 502b and 502c are also considered (e.g., connected in parallel). The energy storage devices 502a, 502b and 502c may be connected to charging devices 512a, 512b and 512c respectively. The charging device 512a may have a negative terminal 552a and a positive terminal 554a. The charging device 512b may have a negative terminal 552b and a positive terminal 554b. The charging device 512c may have a negative terminal 552c and a positive terminal 554c.

There may exist between the energy storage devices 502a, 502b and 502c and the charging devices 512a, 512b and 512c one or more electrical regulators 572a, 572b and 572c, as indicated in the illustration of FIG. 5. These electrical regulators 572a, 572b and 572c may be for example electrical switches that may be used to connect, disconnect, and/or otherwise regulate the connection between the energy storage device 502a, 502b and 502c and the charging devices 512a, 512b and 512c. The illustration of system 500, as an example, depicts only three charging device 512a, 512b and 512c. However, the number of charging devices may be one, two, three or more.

The energy storage devices 502a, 502b and 502c may be electrically coupled to electrical sensors which for example could be integrated into measurement devices 520a, 520b and 520c which may display, on display units 524a, 524b and 524c, the value of the measured parameters. The measured parameters may include voltage, current or other electrical parameters. The illustration of system 500, as an example, depicts only three measurement devices 520a, 520b and 520c which are electrically coupled to the energy storage device 502a, 502b and 502c. However, the number of measurement devices may be one, two, three or more.

As depicted in FIG. 5 a controller 510, which may be an example of the controller 110 in the system 100 of FIG. 1 or the controller 210 in the system 200 of FIG. 2, may be communicatively coupled to the measurement devices 520a, 520b and 520c. The controller 510 may also be communicatively coupled to the charging devices 512a, 512b and 512c. The controller 510 may receive signals, information and data from measurement devices 520a, 520b and 520c, and the controller 510 may process the signals, the information and the data to calculate and determine process parameters in order to control the operation and the functions of the charging device 512. For example, the controller 510 is configured to activate one or more of the charging devices 512a, 512b and 512c to charge of the energy storage devices 502a, 502b and 502c in response to a charge level falling below a first threshold charge level. Similarly, the controller 510 can continue to monitor the charge levels of the energy storage device 502a, 502b and 502c, and end provision of power if a charge level exceeds a second threshold charge level.

Figure 6:
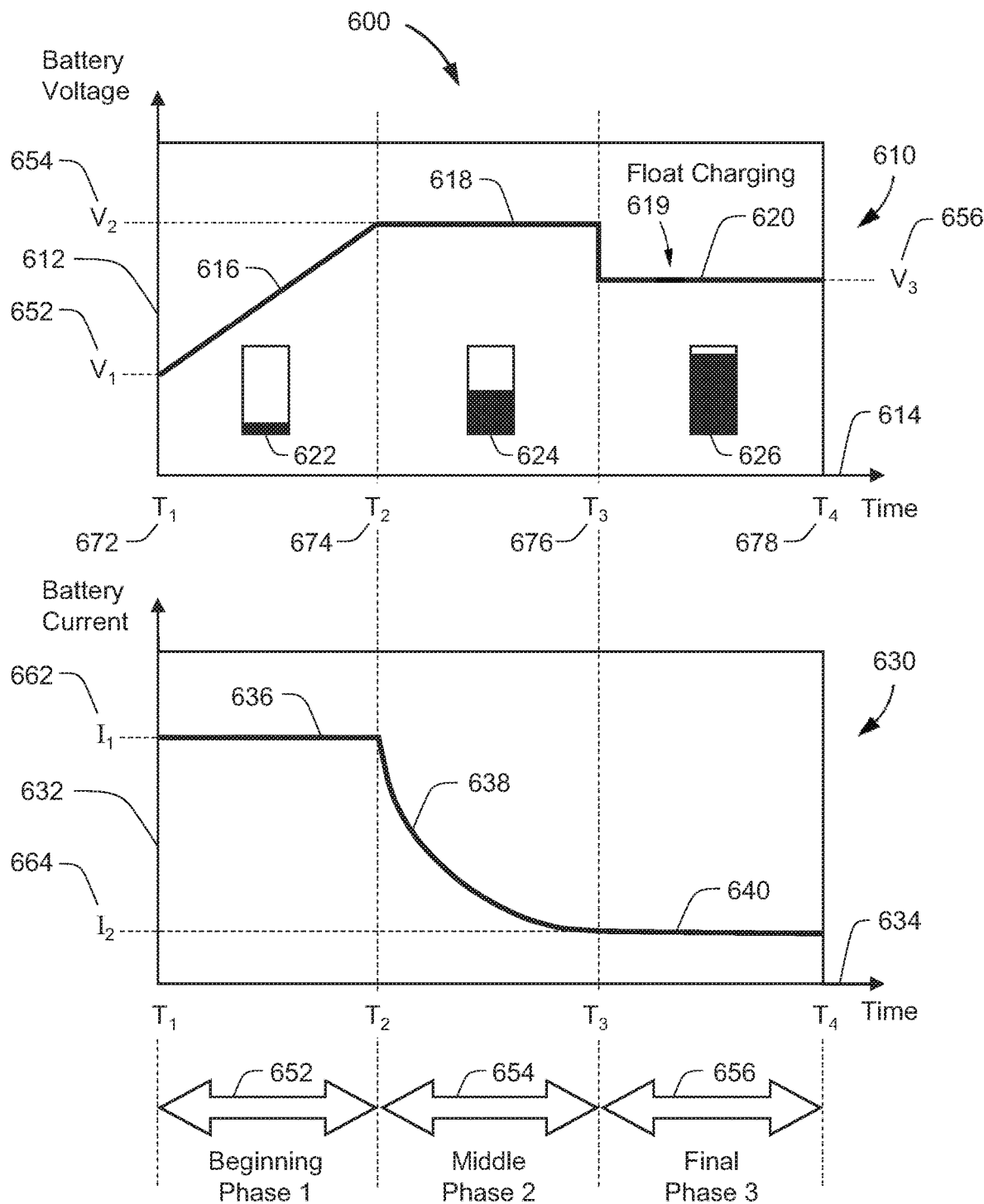
FIG. 6 illustrates an example of a process for charging an energy storage device, and the exemplary variations of voltage and/or current levels during the charging process in accordance with aspects of this disclosure.

FIG. 6 illustrates an example 600 of the changes in voltage and current as the energy storage device (e.g. 108 or 208) is charged. Characteristic profile graph 610 depicts the changes in voltage with respect to time. Characteristic profile graph 630 depicts the changes in current with respect to time, on the same time scale as the time scale of characteristic profile graph 610.

The vertical axis 612 of profile 610 indicates the energy storage device voltage and the horizontal axis 614 indicates the time. On profile 630 the vertical axis 632 indicates the energy storage device current and the horizontal axis 634 indicates the time. The time period starting at $T_1$ (indicated by 672) and ending at $T_2$ (indicated by 674) is referred to herein as the beginning phase 1 (indicated by 652). The time period starting at $T_2$ (indicated by 674) and ending at $T_3$ (indicated by 676) is referred to herein as the middle phase 2 (indicated by 654). The time period starting at $T_3$ (indicated by 676) and ending at $T_4$ (indicated by 678) is referred to herein as the final phase 3 (indicated by 656). During beginning phase 1, the charge of the energy storage device, as indicated by image 622 is relatively low. During the middle phase 2, the charge of the energy storage device, as indicated by image 624 is at a relatively higher level as compared to the charge of the energy storage device in the beginning phase 1 and indicated by image 622. During the final phase 3, the charge of the energy storage device is near a level of full charge or at full charge as indicated by the image 626. The power to charge the energy storage device during the beginning phase 1 and middle phase 2 may be provided by a generator (e.g., generator 104, 201) and/or an external power source (e.g., power source 144, 244). The power charge the energy storage device during the final phase 3 may be provided by a charging device (e.g., charging devices 142, 242).

Referring to the characteristic profile graph 610, at time $T_1$ (indicated by 672) the value of the energy storage device voltage is $V_1$ (indicated by 652). As illustrated by image 622, at time $T_1$ (indicated by 672), the energy storage device charge is relatively low. During time period starting at $T_1$ (indicated by 672) and ending at $T_2$ (indicated by 674), the value of the energy storage device voltage increases from the value $V_1$ (indicated by 652) at time $T_1$ (indicated by 652) to the value $V_2$ (indicated by 654) at time $T_2$ (indicated by 674). The time period starting at $T_1$ (indicated by 652) and ending at $T_2$ (indicated by 674) is referred to herein as the beginning phase 1 (indicated by 652). In the characteristic profile graph 610 it is depicted, as an example, that the increase of energy storage device voltage from value $V_1$ (indicated by 652) to value $V_2$ (indicated by 654) is linear (indicated by 616). However, the voltage increase profile may be of other shapes other than a linear shape as set by the user and/or determined by the control algorithms.

Referring to the characteristic profile graph 630, during time period starting at $T_1$ (indicated by 672) and ending at $T_2$ (indicated by 674), which is the beginning phase 1 (indicated by 652), the value of the energy storage device current may stay constant the current level $I_1$ (indicated by 662). In the characteristic profile 630, it is depicted, as an example, that the energy storage device current profile 636 is constant and linearly flat. However, the current profile 636 may be of other shapes other than a linear shape, as set by the user and/or determined by the control algorithms.

Referring to the characteristic profile graph 610, at time $T_2$ (indicated by 674) the energy storage device voltage, as an example, may stay constant (indicated by 618) at the value $V_2$ (indicated by 654) as the energy storage device is getting charged as indicated by the image 624. The time period starting at $T_2$ (indicated by 674) and ending at $T_3$ (indicated by 676) is referred to herein as the middle phase 2 (indicated by 654). In the characteristic profile graph 610 it is depicted, as an example, that the energy storage device voltage stays constant (indicated by 618) during the time period starting at $T_2$ (indicated by 674) and ending at $T_3$ (indicated by 676) however the voltage profile 618 may have other shapes than the linear shaped depicted as an example in the characteristic profile graph 610.

Referring to the characteristic profile graph 630, during time period starting at $T_2$ (indicated by 674) and ending at $T_2$ (indicated by 676), which is the middle phase 2 (indicated by 654), the value of the energy storage device current decrease from the current level $I_1$ (indicated by 662) to the current level $I_2$ (indicated by 664). In the characteristic profile graph 630 it is depicted, as an example, that the energy storage device current profile 638 is a decreasing curved profile. However, the current profile 638 may be of other shapes other than a decreasing curved profile, as set by the user and/or determined by the control algorithms.

At time $T_3$ (indicated by 676) the energy storage device voltage, as an example, may drop to the value $V_3$ (indicated by 656). The region between time $T_3$ (indicated by 676) and time $T_4$ (indicated by 678) is the float charging region 619 of the energy storage device charging process, during which time the charge of the energy storage device is near a fully charged level, or at a fully charged level, as indicated by the image 626. The time period starting at $T_3$ (indicated by 676) and ending at $T_4$ (indicated by 678) is referred to herein as the final phase 3 (indicated by 656). In the characteristic profile graph 610 it is depicted, as an example, that the energy storage device voltage stays constant (indicated by 620) during the time period starting at $T_3$ (indicated by 676) and ending at $T_4$ (indicated by 678), however the voltage profile 620 may have other shapes than the linear constant shape depicted as an example in the characteristic profile graph 610.

Referring to the characteristic profile graph 630, during time period starting at $T_3$ (indicated by 676) and ending at $T_4$ (indicated by 678), which is the final phase 3 (indicated by 656), the value of the energy storage device may stay constant at current level $I_2$ (indicated by 620), or may decrease slightly at a very low linear rate. In the characteristic profile 630 it is depicted, as an example that the energy storage device current profile 640 is decreasing at a very low linear rate and is almost constant. However, the current profile 640 may be of other shapes other than a very low linear rate or constant, as set by the user and/or determined by the control algorithms.

During the float charging process 619, starting at time $T_3$ (indicated by 676) and ending at time $T_4$ (indicated by 678), a float charger charges the energy storage device at a similar rate as an energy storage device discharges by itself. In this fashion, the float charger maintains a full capacity energy storage device. A float charger, in contrast to a conventional battery charger, has circuitry to prevent the battery from overcharging. Overcharging may result in the battery getting damaged. Float charging is performed as a charging method for maintaining the health of the energy storage device and it is used when the charge of the energy storage device is at a level that is near a full charge level as indicated by the image 626. In a charging process that includes of multistage charging, float charging 619 may be the final stage (or phase) 656 and/or a frequently updated phase in the energy storage device charging process. For example, the float charging device receives signals, information and data from a control and/or a measurement device indicating that the energy storage device is at a level below the level of being fully charged. The float charging device then applies a controlled amount of voltage and/or current that is used to charge the energy storage device without causing damage to the energy storage device. The float charging operation may be implemented at any time, regardless of discharge characteristics. In other words, the controller may monitor the charge level of an energy storage device periodically and/or based on an input (e.g., a user input, a trigger event such as a welding operation, in response to a timer, etc.), and control the charging device to charge the energy storage device. Once the measurement device senses that the energy storage device charge is at a desired level (e.g., the maximum level), and/or that the energy storage device is fully charged, the charging device is turned off and, as a result, no more voltage and/or current is provided to the energy storage device.

The precise voltage profiles (616, 618 and 620) of the characteristic profile graph 610 may be set by the controller, historical data, and/or the user, via the user interface 232 of FIG. 2 an example of which is depicted in FIG. 3. Similarly, the precise current profiles (636, 638 and 640) of the characteristic profile graph 630 may be set by the user, via the user interface 232 or 300. The precise values of the time parameters $T_1$ (indicated by 672), $T_2$ (indicated by 674), $T_3$ (indicated by 676) and $T_4$ (indicated by 678) may also be set by the user, via the user interface 232 or 300. Similarly, the user via the user interface 232 or 300, may set the values of the voltage parameters $V_1$ (indicated by 652), $V_2$ (indicated by 654) and $V_3$ (indicated by 656) and the current parameters $I_1$ (indicated by 662) and $I_2$ (indicated by 664). The user, via the user interface 232 or 300, may set the duration of the beginning phase 1 (indicated by 652), middle phase 2 (indicated by 654) and final phase 3 (indicated by 656).

Additionally or alternatively, either independently or in combination with the user inputs, the controller(s) 110, 210, 410 or 510 may automatically determine and set the time parameters $T_1$ (indicated by 672), $T_2$ (indicated by 674), $T_3$ (indicated by 676) and $T_4$ (indicated by 678), and the voltage parameters $V_1$ (indicated by 652), $V_2$ (indicated by 654) and $V_3$ (indicated by 656), and the current parameters $I_1$ (indicated by 662) and $I_2$ (indicated by 664), and the time duration of the beginning phase 1 (indicated by 652), middle phase 2 (indicated by 654) and final phase 3 (indicated by 656). For example, stored and/or learned data may be employed to set or adjust one or more parameters to maintain a charge on the energy storage device.

Figure 7:
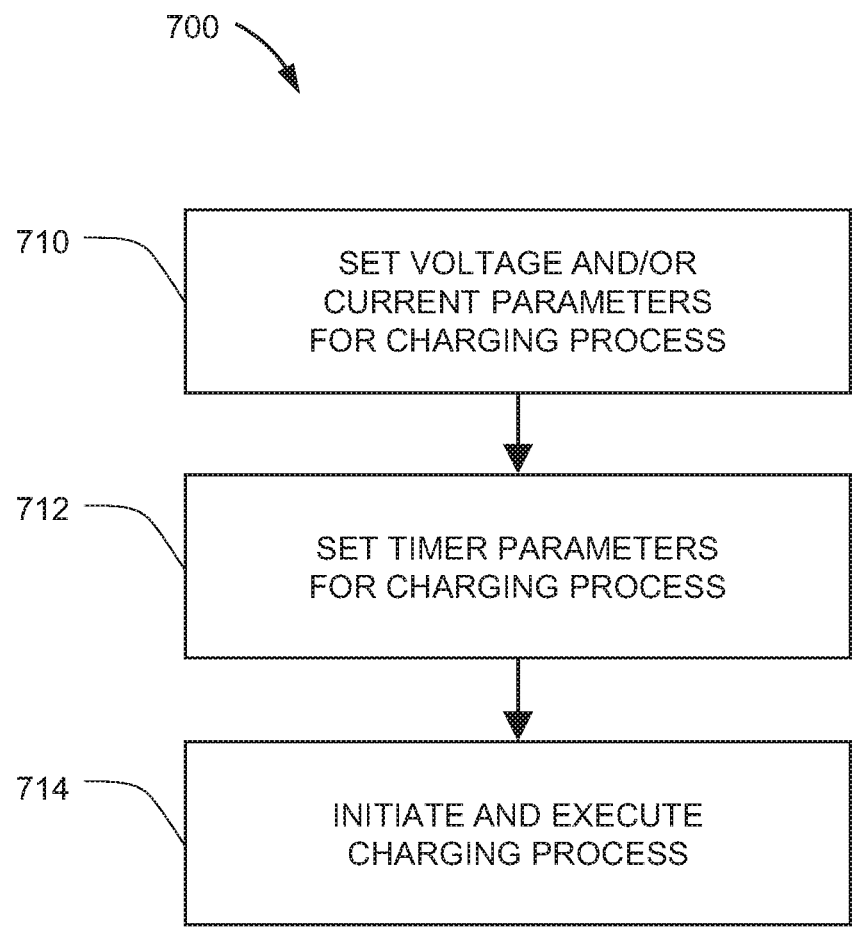
FIG. 7 illustrates an example of a method for charging an energy storage device using a charging device in accordance with aspects of this disclosure.

FIG. 7 illustrates an example of the method 700 for an energy storage device charging process. At block 710 the controller determines the parameters for executing the charging process, in response to an input from a user, via the exemplary user interface 232 or 300, remotely provided information, and/or data from a measurement device, thereby setting the voltage and current parameters for the charging process. Additionally or alternatively, at block 712 the user may set the time parameters for the charging process. As disclosed herein, either independently or in combination with the user inputs, the controller(s) 110, 210, 410 or 510 may automatically calculate, determine and set some or all the voltage, current and time related parameters. At block 714 the controller and/or the user may initiate and execute the charging process, for example, the charging process depicted in FIG. 6.

Figure 8:
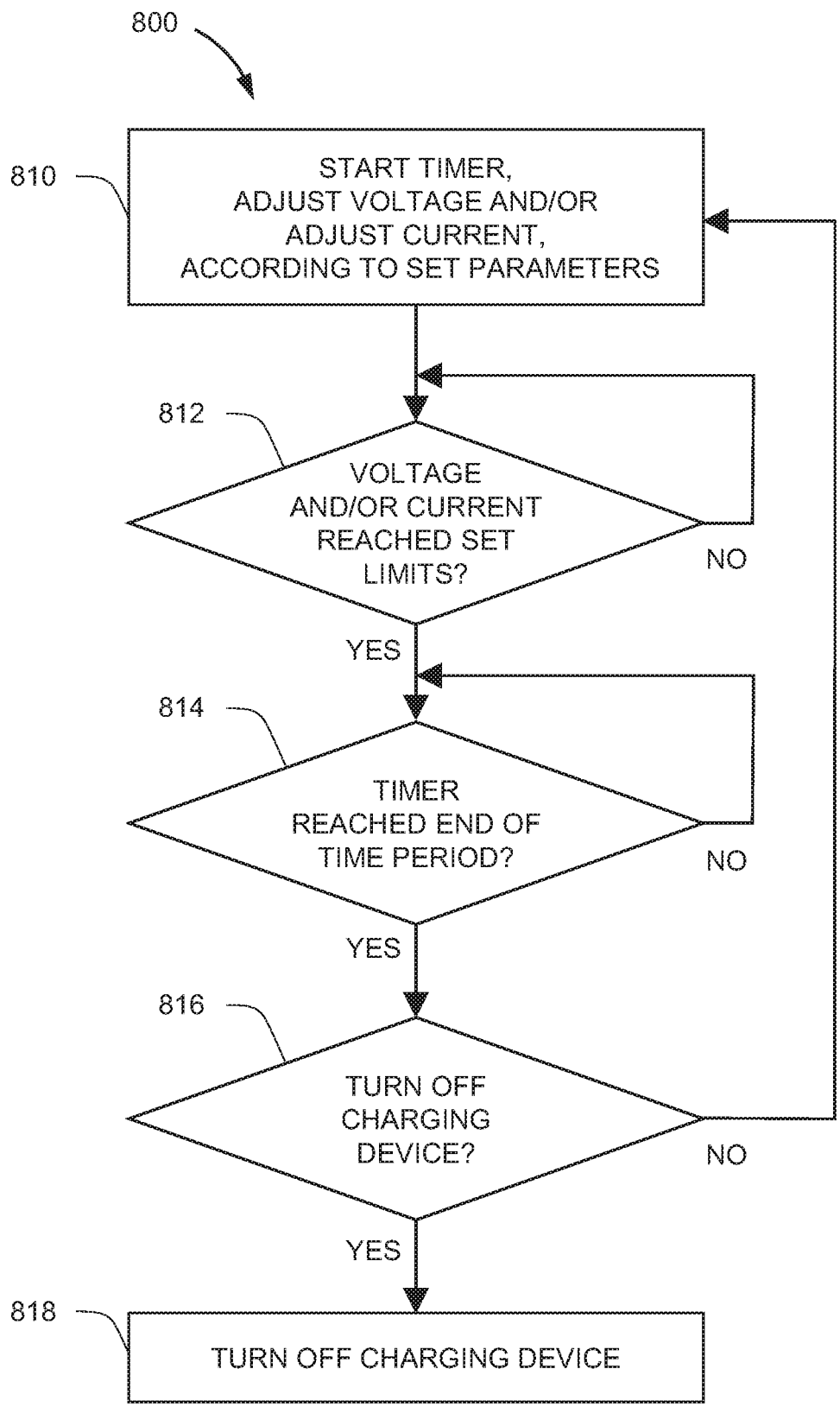
FIG. 8 illustrates another example of a method for charging an energy storage device using a charging device in accordance with aspects of this disclosure.

FIG. 8 illustrates an example of the method 800 for one or more phases of the energy storage device charging process that is, for example, depicted in FIG. 6. These phases of the charging process may, for example as depicted in FIG. 6, be the beginning phase 1 (indicated by 652), middle phase 2 (indicated by 654) and final phase 3 (e.g. the float charging phase indicated by 656). At block 810 the controller(s) 110, 210, 410 or 510 may control the charging device and/or the regulator to provide power to the start the timer and adjust the voltage and/or adjust the current according to set parameters. At block 812, the controller(s) may determine if the voltage and/or have reached one or more predetermined values (e.g., threshold charge levels). If the voltage and/or current have reached a predetermined value, the controller may then check at block 814 whether or not the time has reached the end of a timer period. If the timer has reached the end of the time period, then the controller may determine at block 816 whether or not to turn off the charging device and may then move on to block 818 at which point the controller turns off the charging device.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
   an energy storage system to provide a power output, the energy storage system comprising one or more energy storage devices;
   one or more charging devices connected to the one or more energy storage devices; and
   a controller configured to:
      determine a respective charge level for each energy storage device;
      rank each energy storage device based on a comparison of each respective charge level; and
      control the one or more charging devices to provide a charging power output to a first energy storage device of the one or more energy storage devices with a lower relative charge level prior to a second energy storage device with a higher relative charge level.

2. The system of claim 1, wherein the controller is further configured to:
   compare the respective charge levels to one or more threshold charge levels;
   control the one or more charging devices to provide a charging power output to the first energy storage device when the charge level is below a first threshold charge level of the one or more threshold charge levels; and
   control the one or more charging devices to end provision of the charging power output to the energy storage device in response to the charge level exceeding a second threshold charge level.

3. The system of claim 2, wherein the controller is further configured to control a single charging device of the one or more charging devices to provide the charging power output to two or more energy storage devices of the one or more storage devices with a charge level below the first threshold charge level.

4. The system of claim 1, wherein the one or more charging devices includes a first charging device and a second charging device, and the one or more energy storage devices includes a first energy storage device and a second energy storage device.

5. The system of claim 4, wherein the controller is further configured to:
   control the first charging device to provide a first charging power output to the first energy storage device; and
   control the second charging device to provide a second charging power output to the second energy storage device.

6. The system of claim 1, wherein the controller is further configured to control a rate or level of the charging output to the energy storage device based on a characteristic of the energy storage device.

7. The system of claim 6, wherein the characteristic comprises one or more of voltage, temperature, current, total time in use, or a relative charge level.

8. The system of claim 1, wherein the controller is further configured to generate an alert when the charge level of the energy storage device falls below one or more threshold charge levels or when the charging power output does not increase the charge level of the energy storage device.

9. The system of claim 1, further comprising a controller that includes one or more of a network interface or a memory storage, the controller further configured to:
- receive information from the system;
- store the information in the memory storage device; or
- transmit the information to a remote computing platform via the network interface.

10. A welding-type power system, comprising:
- an engine configured to drive an electric generator to provide a first power output;
- a supplemental power source connection to receive a supplemental power output from a supplemental power source;
- an energy storage system to provide a second power output, the energy storage system comprising a first energy storage device and a second energy storage device;
- a first charging device connected to the first energy storage device and configured to receive the first power output;
- a second charging device connected to the second energy storage device and configured to receive the supplemental power output; and
- a controller configured to:
  - determine a first charge level for the first energy storage device, and a second charge level for the second energy storage device;
  - compare the first and second charge levels to one or more threshold charge levels; and
  - control the one or more of the first and second charging devices to provide a charging power output to one or more of the plurality of energy storage devices with a charge level below a first threshold charge level of the one or more threshold charge levels.

11. The system of claim 10, wherein the supplemental power source is one or more of an engine driven generator or main power.

12. The system of claim 11, wherein the controller is further configured to control the supplemental power source to provide the supplemental power output to the one or more charging devices or to the plurality of energy storage devices.

13. The system of claim 11, wherein the connection comprises a step-down converter to connect one of the electric generators or the supplemental power supplies to the one or more charging devices, the converter to condition the first power output in order to recharge the one or more charging devices from one or more of the electric generator or the supplemental power supply.

14. The system of claim 10, further comprising one or more regulators to control flow of current from the one or more charging devices to the one or more energy storage devices.

15. The system of claim 14, wherein the controller is further configured to control the one or more charging devices and the one or more regulators to provide a charging power output to an energy storage device of the one or more energy storage devices based on one or more parameters related to the charge level of the one or more energy storage devices.

16. The system of claim 15, wherein the one or more parameters comprises a charge level of the energy storage device, duration of a timer, or a user input.

17. The system of claim 14, wherein the one or more regulators are arranged between the one or more charging devices and the one or more energy storage devices, wherein the one or more regulators comprises one of a resistor, a switch, or an inductor.

18. The system of claim 10, further comprising a user interface configured to send information to and receive information from the controller, wherein the information comprises instructions to adjust one or more of a charging power output start time, a duration of a charging power output timer expiration, or one or more threshold charge levels.

19. The system of claim 10, wherein the one or more charging devices comprises one or more of a lead acid battery, a nickel cadmium battery, a lithium ion battery, a capacitor, a supercapacitor, a fuel cell, or any combination thereof.

\* \* \* \* \*